United States Patent [19]

Shannon

[11] Patent Number: 4,984,459
[45] Date of Patent: Jan. 15, 1991

[54] RATE OF TURN INDICATOR

[76] Inventor: E. Paul Shannon, Rte. 2, Box 249, Killen, Ala. 35645

[21] Appl. No.: 410,285

[22] Filed: Sep. 21, 1989

[51] Int. Cl.$^5$ ............................................. G01C 19/06
[52] U.S. Cl. ...................................... 73/178 R; 74/5.7
[58] Field of Search ................ 73/504, 178 R; 74/5.7

[56] References Cited

U.S. PATENT DOCUMENTS

| | | | |
|---|---|---|---|
| 2,815,584 | 12/1957 | Watson | 73/504 |
| 2,948,156 | 8/1960 | Barkalow | 74/5.7 |
| 3,299,716 | 1/1967 | Stiles et al. | 74/5.7 |
| 4,240,302 | 12/1980 | Karnick | 73/504 |

Primary Examiner—Donald O. Woodiel
Attorney, Agent, or Firm—Hugh D. Jaeger

[57] ABSTRACT

Rate of turn indicator for a nautical vessel, aircraft and the like indicating the rate of turn or swing in units such as degrees per unit of time from a particular course of travel. The indicator includes a magnetic gyro wheel including a flexible hub rotating about an axis in the same plane as the course of travel and electromagnetic sensing coils receiving the deviations of strength of the electromagnetic field of the magnetic gyro wheel from an axis on turning from the course of travel. The magnetic gyro wheel includes a plurality of permanent magnets of alternating poles positioned about a circumferential axis of a circular member, and a flexible hub material affixed to the interior diameter of the circular member. The hub is affixed to an axially support shaft. The magnetic gyro wheel is in close proximity to a motor driven nonferrous metallic plate and is driven by eddy currents being induced into the non-ferrous magnetic plate, thus produced. This causes a mechanical drag between gyro and metallic drive plate, causing rotation of the gyro. There is no other mechanical connection between the two members. The rate of turn indicator includes a meter connected to the electromagnetic sensing coils through electrical circuitry and a potentiometer for zeroing the meter where the meter indicates the rate of turn.

1 Claim, 9 Drawing Sheets

RATE OF TURN INDICATOR

BACKGROUND OF THE INVENTION

1. Field of the Invention

The present invention relates to a navigational aid or nautical instrument, and more particularly, pertains to a rate of turn indicator for indicating the rate of turn from a course of travel for a vessel or other like vehicle.

2. Description of the Prior Art

One of the most critical problems confronting the shipping industry, particularly towboats, is steering a vessel on a straight and true course without swinging or turning from the predetermined course due to forces of nature such as winds, tides, waves, etc.

The prior art gyros also contain many points of mechanical friction which make them difficult or impossible to respond to very low rates of turn and to properly return to zero.

Prior art gyroscopic instruments have been very expensive. The prior art gyros are usually complex, expensive, electromechanical instruments with numerous mechanical components subject to structural failure, in addition to electrical failure. The prior art instruments have included components such as gears, springs, rotors and brushes, centrifugal switches, all of which are subject to failure. Finally, the instruments have circuitry which sparks and can be hazardous in explosive environments. In any event, if the instruments are purchased, after a costly financial outlay by an operator, the installation, subsequent maintenance, and repair are expensive.

U.S. Pat. No. 4,316,389, incorporated herein by reference, teaches a novel rate of turn indicator which overcomes many of the disadvantages of the prior art. However, this reference teaches a system wherein the gyro wheel and the drive motor are fixedly attached by mechanical means. Unfortunately, this tends to provide a system which may be subject to mechanical shock in certain environments.

The present invention overcomes the disadvantages of prior art by providing a rate of turn indicator having easy visual readout for a steersman of a vessel that a rate of turn or swing is occurring, and yet sensitive and accurate to the rate of turn while eliminating prior art problems due to friction between components. A magnetic drive replaces direct gyro drive systems, thus eliminating and alleviating rotating member fatigue at the hub of the gyro.

SUMMARY OF THE INvENTION

The present invention provides a rate of turn indicator for visually indicating the rate of turn or swing from a course of travel on a zero-center meter positioned on the face of the rate of turn indicator. This meter indication provides visual information to the steersman of the vessel indicating that the vessel is being subjected to a turning motion either to the left or the right, and also provides visual indication for bringing the vessel back onto a straight course if desired.

According to one embodiment of the present invention, there is provided a rate of turn indicator including a motor nondirectly axially rotating a flexible hub magnetic gyro wheel through a nonferrous drive wheel in close proximity to the flexible hub magnetic gyro wheel, electromagnetic sensing coils on a spaced mounting plate adjacent to the magnetic gyro wheel and diametrically opposed to each other, and electrical circuitry connected between the coils and a zero-center meter whereby the rotating flexible hub magnetic gyro wheel induces a current in both coils which drives the meter to one side of center indicating a rate of turn or swing from a course of travel of the vessel. The magnetic gyro wheel includes a hub of flexible material having properties which provide for axial rotation and flexible lateral movement. The magnetic gyro wheel supports at least one pair of permanent magnets, and, as disclosed, a plurality of permanent magnets of alternating poles circumferentially spaced around the flexible hub of the magnetic gyro wheel. Mechanical adjustment structures are provided for adjusting the relative distance of the magnetic gyro wheel from the electromagnetic sensing coils, providing for coarse adjustment of zero centering of the meter along with a potentiometer providing for fine adjustment of the meter. The wheel may be adjusted toward or away from the coils in order to adjust the sensitivity of the instrument. Electrical circuitry is provided for high and low sensitivity of the meter indicating rate of turn or swing from the present course of travel.

One significant aspect and feature of the present invention is a rate of turn indicator which provides direct visual indication to a steersman of a vessel or other like vehicle that a rate of turn or swing is occurring from a course of travel in an angular direction as indicated by the swing of a meter needle from the zero center on the face of a meter. This rate of turn or swing is an easily identifiable visual indication to the steersman of the vessel and provides direct, easily observable indication that a rate of turn or swing is occurring in proportion to the deflection of the meter needle from the zero center on the meter face providing for compensation by the steersman of the vessel. The zero center position of the meter is very important, especially when docking a vessel in inland waterways.

Another significant aspect and feature of the present invention is a rate of turn indicator which is of minimal complexity and has a minimum of moving parts, the flexible hub magnetic gyro wheel, a nonferrous drive wheel, and the meter movement. The present invention relies on the recognition of principles of gyroscopic action, magnetic principles, conduction of currents, and electrical circuitry resulting in a navigational instrument which provides for visual indication of rate of turn or swing from a particular course of travel. The flexible hub magnetic gyro wheel is axially rotated by a motorized nonferrous, but electrically conductive drive wheel in close proximity to the flexible magnetic gyro wheel with nondirect connection therebetween. The rate of turn indicator is a substantially linear instrument.

A further significant aspect and feature of the present invention is a rate of turn indicator which can be moved from position to position within a wheelhouse, or carried between wheelhouses of vessels and only needs be set upon a substantially flat surface, usually within the view of a steersman of a vessel and in view from the steering position of the vessel. No alignment of the instrument is necessary except for centering of the meter with the zero-center control with the fine adjustment. If coarse adjustment is required for the rate of turn indicator, it is only necessary to adjust an L-shaped rod. The instrument is of a compact physical size requiring minimal space and of a desirable small weight not presenting a burdensome weight restriction. Finally, the rate of turn indicator as disclosed can easily operate from the vessel's current.

Significant aspects and features of the present invention include indirectly coupling the gyro to the motor with two distinct advantages. First, the gyro drives the gyro shaft rather than the shaft driving the gyro. This relieves practically all strains from the hub, thus reducing or eliminating hub breakdown. Second, the indirect coupling eliminates meter drift and changes of sensitivity that would otherwise be caused by linear dimensional changes of the motor shaft and to changes of temperature of the motor shaft. Third, the system lends itself to utilizing a compact one unit structure or if needed on such as up and down pilot houses could be separated into sensing and indicator unit connected by long cables.

Having described the present invention, it is a principal objective hereof in providing a rate of turn indicator.

One objective of the present invention is to provide a rate of turn indicator having direct visual readout of the rate of turn or swing from a course of travel which is visually perceived and understandable by a steersman of a vessel or other like vehicle. The navigational instrument, being the rate of turn indicator, visually displays the information readily readable on a meter face of the instrument, and corresponds proportionally to the angular turn or swing of the vessel, which may include a tow of barges or just a vessel itself, such as a towboat, freighter, tanker, or other like vehicle.

Still another objective of the present invention is to provide a rate of turn indicator utilizing a magnetic gyro wheel of novel construction with minimal components, especially friction components, and of economical feasibility. One requirement is that the flexible hub magnetic gyro wheel is axially rotated about a radial axis by a motorized nonferrous drive wheel, but yet also is flexible providing for lateral movement corresponding to the angular directional turn of a vessel or like vehicle. The magnetic gyro wheel meets this objective by providing a plurality of permanent magnetic domains of alternating poles spaced about an outer periphery of a circumferential, flexible hub member having axial stiffness, but lateral flexibility providing for gyroscopic action of the magnetic poles of the magnetic gyro wheel occurring on account of variation from the course of steerage.

A further objective of the present invention is a rate of turn indicator which provides the steersman of the vessel the ability to steer a straight course while indicating any deviation or variation from that course, thus saving energy of the vessel in steering a straight course, and further—and most importantly—protecting life and property. The rate of turn indicator indicates the slightest variation from a straight course, and upon that variation occurring, visually displays this information on the face of the meter. This information can be interpreted by the steersman of a vessel instantaneously providing for correction of the course, thus saving energy and protecting life and property on the water. The environment is also protected from undue spills of cargoes such as oil or dangerous chemicals.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DESCRIPTION OF THE PREFERRED EMBODIMENTS

Figure 1:
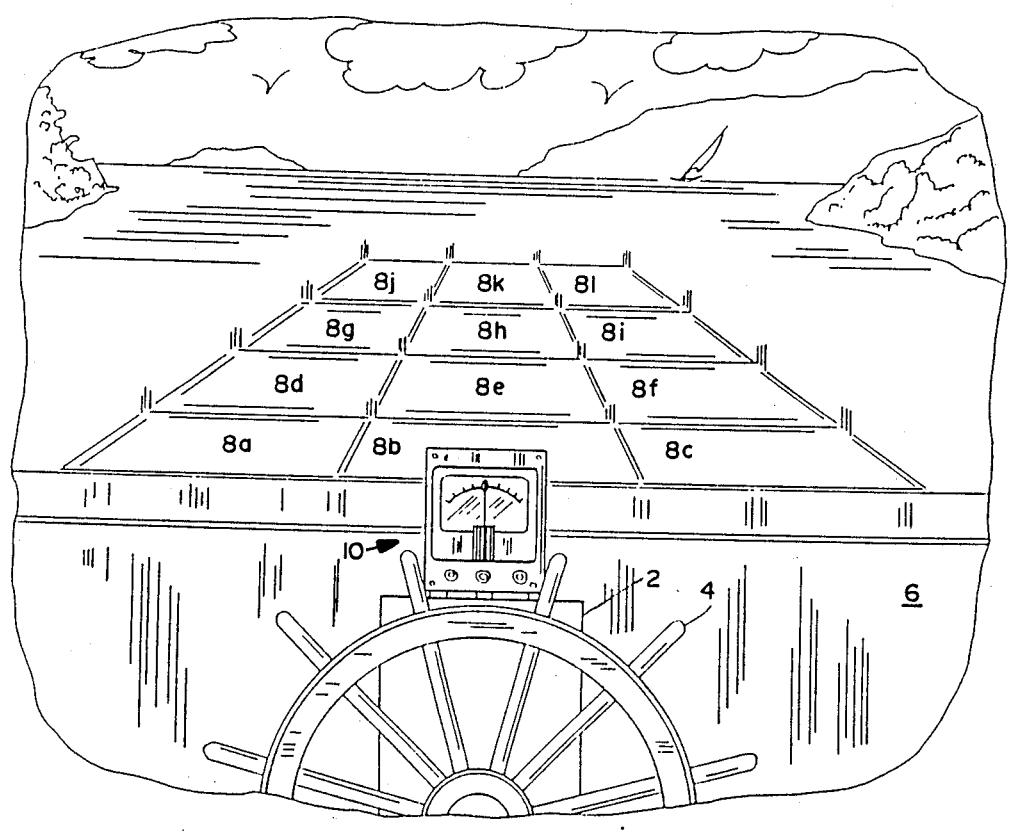
FIG. 1 illustrates a front view through a pilothouse window of a towboat showing a rate of turn indicator, the present invention, in a convenient viewing position of a wheel.

FIG. 1 illustrates a front view through a pilot-house window of a towboat showing a rate of turn indicator 10, the present invention, on a bridge shelf 2 within view of a wheel 4 in a wheel-house 6 of a towboat. The towboat pushes a tow of barges 8a–8l on a river 19. The tow of barges is not construed to be limited in number, and is only illustrated by way of example and for purposes of illustration only.

Figure 2:
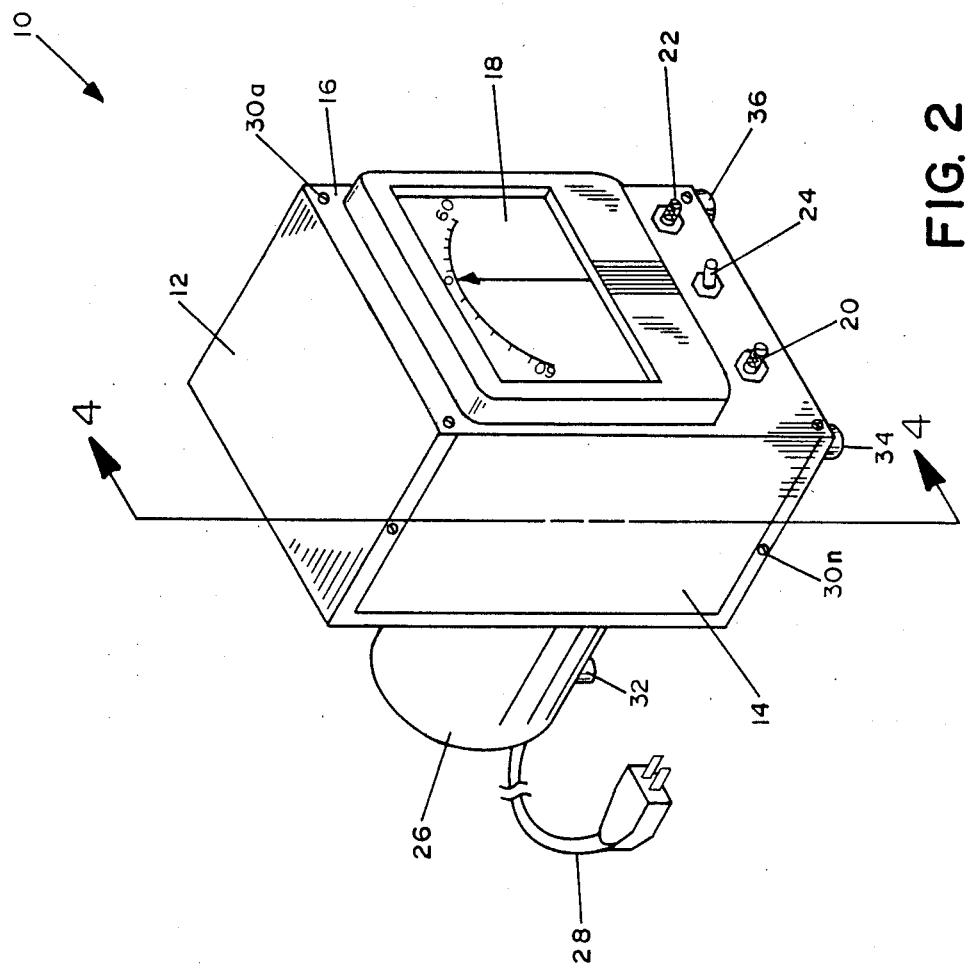
FIG. 2 illustrates a perspective view or the rate of turn indicator.

FIG. 2 illustrates a perspective view of a rate of turn indicator 10 including a rearward instrument housing 12, a forward instrument housing 14, and a front panel 16 secured to a portion of the forward instrument housing 14. A rate of turn meter 18, a meter illumination potentiometer 20, a zeroing potentiometer 22 and a sensitivity switch 24 are located on the front panel 16. A motor 26 secures to the rear portion of the rearward instrument housing 12 and includes a power cord and plug 28. A plurality of fasteners 30a–30n secure the front panel 16, the rearward instrument housing 12, and the forward instrument housing 14 to each other. Rubber feet 32, 34 and 36 mount to the motor 26 and to the underside of the rearward instrument housing 12 to support the rate of turn indicator 10.

Figure 3:
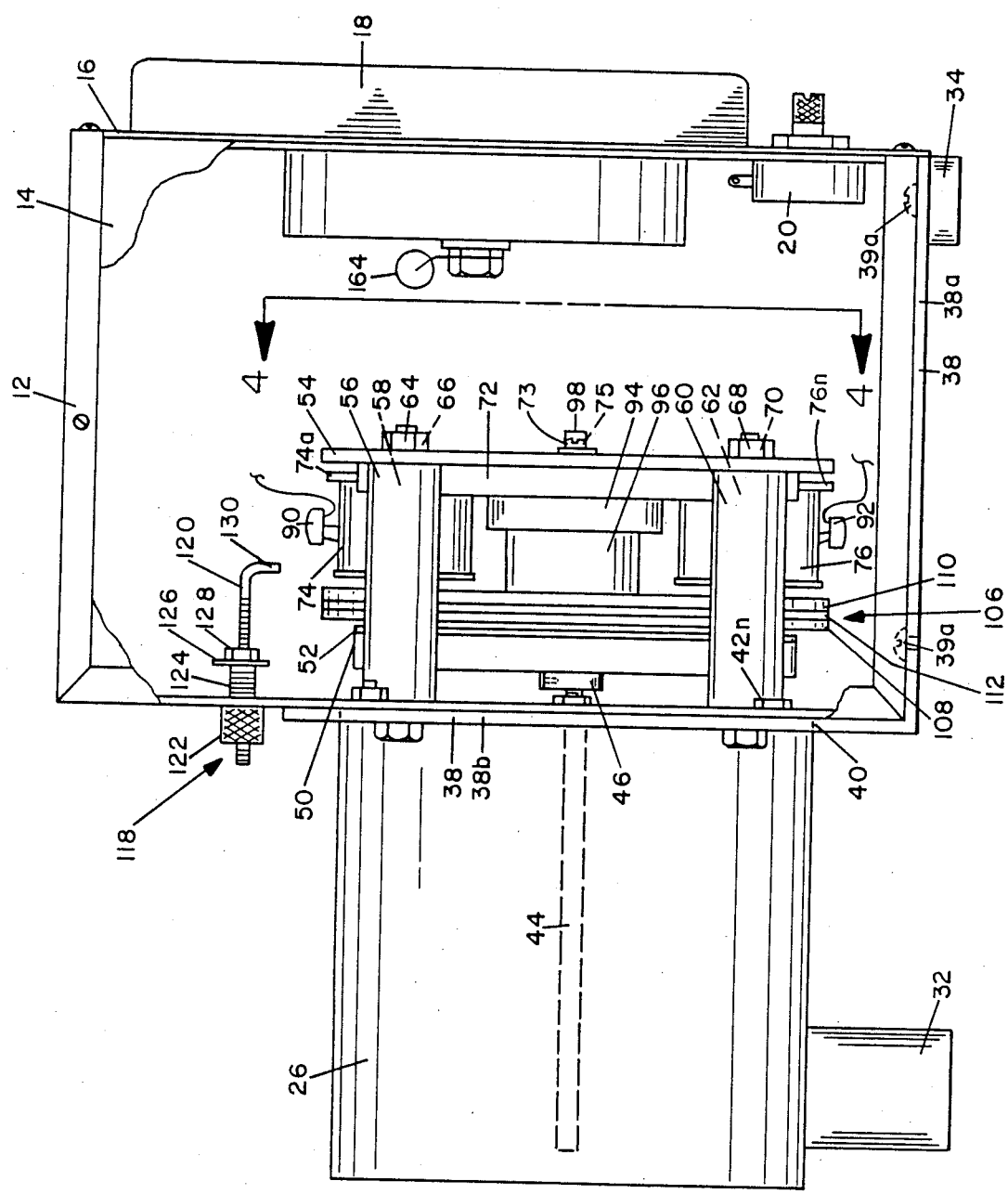
FIG. 3 illustrates a cutaway side view of the rate of turn indicator.
Figure 4:
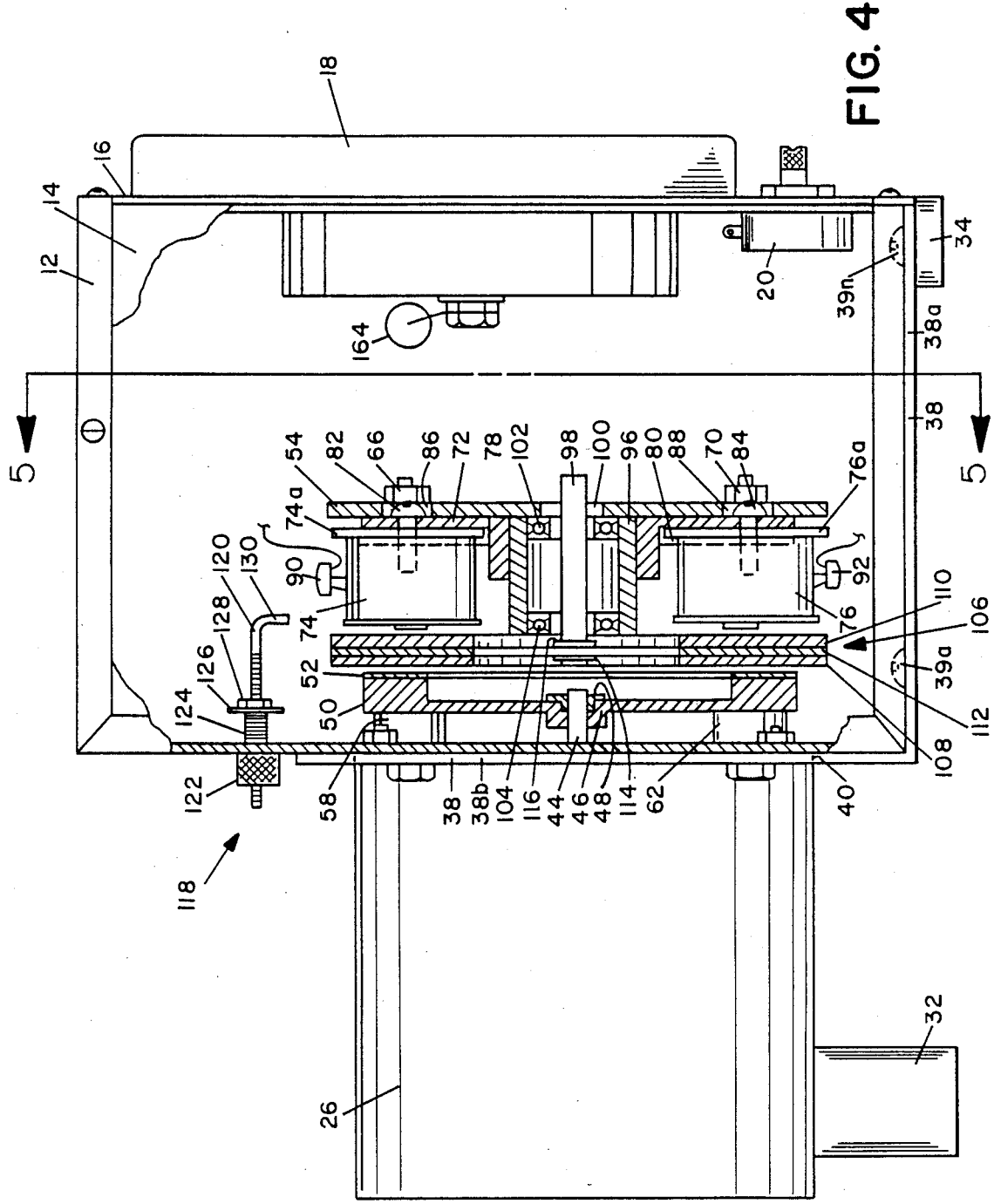
FIG. 4 illustrates a sectional view taken along line 4—4 of FIG. 3.

FIGS. 3 and 4 illustrate a cutaway side VieW and a sectional view, respectively, of the rate of turn indicator 10 where all numerals correspond to those elements previously described. A yoke bracket 38, the horizontal portion 38a of which secures to the bottom portion of the rearward instrument housing 12 with a plurality of fasteners 39a–39n. The vertical portion 38b of the yoke bracket 38 extends along the back side of the rearward instrument housing 12 and includes a circular cutout 40 for accommodation of the motor 26. A plurality of nuts 42a–42n secure over the motor mounting studs to secure the motor 26 to the rear panel of the rearward instrument housing 12 and to the vertical portion 38b of the yoke bracket 38. A drive shaft 44 extends from the motor 26 into a set collar 46 on the metallic non-ferrous circular drive wheel 50 as illustrated in detail in FIG. 4, which is one unit. A felt coating 52 is located on one edge of the circular drive wheel 50. The circular drive wheel 50 is driven by the motor 26. A mounting plate 54 mounts to the rearward instrument housing 12 and the vertical portion 38b of the yoke bracket 38 by support post spacers 56, 58, 60 and 62 and nut and bolt assemblies 64, 66, 68 and 70 extending through the mounting plate 54, through the centers of the support post spacers 56, 58, 60 and 62, and through the vertical portion 38b of the yoke bracket 38. A bearing and magnetic sensor coil yoke 72 secures to the mounting plate 54 with fasteners 73 and 75. Electromagnetic sensing coils 74 and 76 include square mounting bases 74a and 76a. The mounting bases 74a and 76a and respective electromagnetic sensing coils 74 and 76 secure in recesses 78 and 80 by machine screws 82 and 84 as illustrated in FIG. 4. As also illustrated in FIG. 4, body holes 86 and 88 accommodate the heads of the machine screws 82 and 84. Bridge rectifiers 90 and 92 secure physically and electrically to the electromagnetic sensing coils 74 and 76, respectively. An annular bearing housing retainer 94 extends from the bearing and magnetic sensor coil yoke 72 to accommodate a bearing housing 96. A gyro wheel shaft 98 extends through a body hole 100 in the mounting plate 54, through front and rear bearings 102 and 104 which are enclosed and frictionally engaged in the bearing housing 96 and to a gyro wheel 106 as illustrated in FIG. 4. The gyro wheel 106 includes a back magnetic disc 108, a front magnetic disc 110 and a rubber reinforced flexible hub 112 which is the subject of U.S. Pat. No. 4,299,127 issued to the applicant and which is further illustrated in FIG. 6. The gyro wheel shaft 98 secures to the flexible hub 112 of the gyro wheel 106 by set washers 114 and 116 as illustrated in FIG. 4. A coarse needle zero adjustment assembly 118 is positioned perpendicularly through the rear portion of the rearward instrument housing 12. A knurled adjustment knob 122 secures over one end of the L-shaped rod 120 on the exterior of the rearward instrument housing 12. A spring 124 is captured between the interior of the rearward instrument housing 12, and a washer 126 and a nut 128 on the L-shaped rod 120 to provide tension across and along the L-shaped rod 120 so that it will be held in the position in which the L-shaped rod angled end 130 is positioned by rotational adjustment of the knurled adjustment knob 122 The angled end of the L-shaped rod 120 is brought in proximity to the gyro wheel 106 to effect a coarse adjustment of the rate of turn meter 18.

Figure 5:
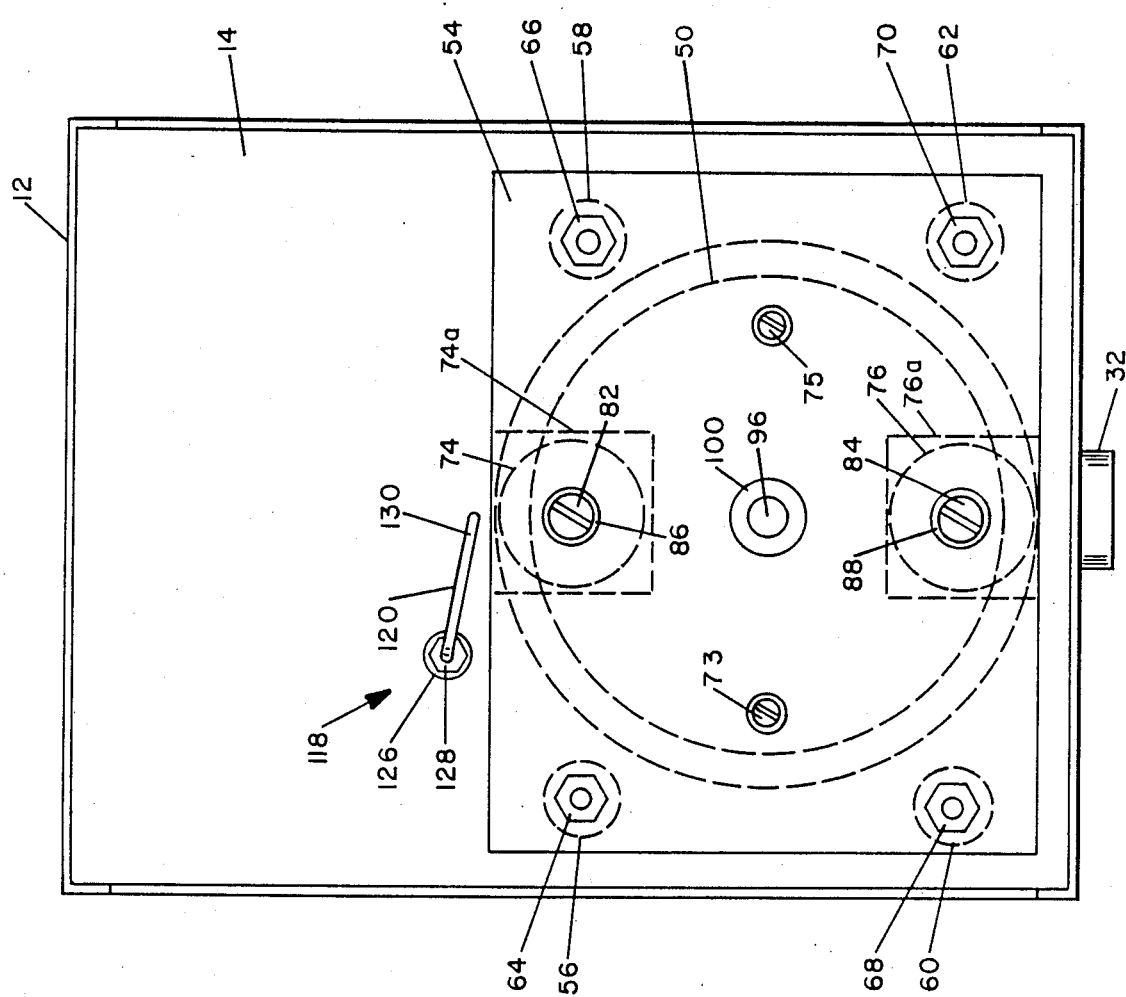
FIG. 5 a view taken along line 5—5 of FIG. 4.

FIG. 5 illustrates a view of the mounting plate 54 of the rate of turn indicator 10 as viewed from line 5—5 of FIG. 4 where all numerals correspond to those elements previously described.

Figure 6:
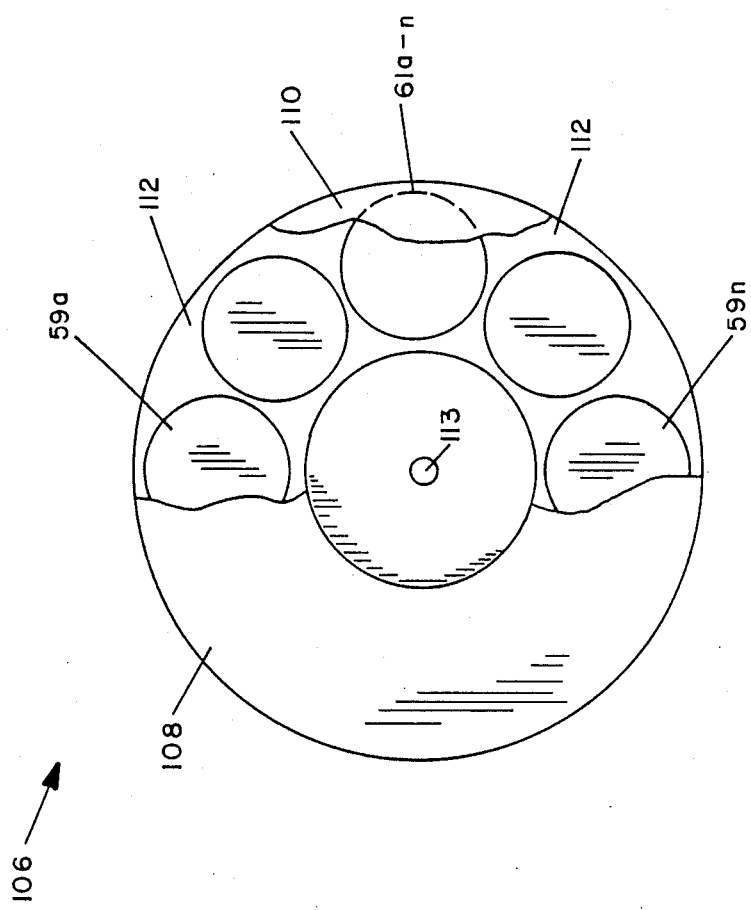
FIG. 6 illustrates a front view of a flexible hub magnetic gyro wheel, partly in cross section.

FIG. 6 illustrates a front view of a flexible hub magnetic gyro wheel 106 partly in cross section where all numerals correspond to those elements previously described. Included in the flexible hub magnetic gyro wheel 106 are opposing mirror image back magnetic disc 108 and front magnetic disc 110 with the flexible hub 112 secured therebetween. A plurality of ceramic magnets 59a-59n and 61a-61n are molded into the magnetic discs 108 and 110, respectively.

Figure 7:
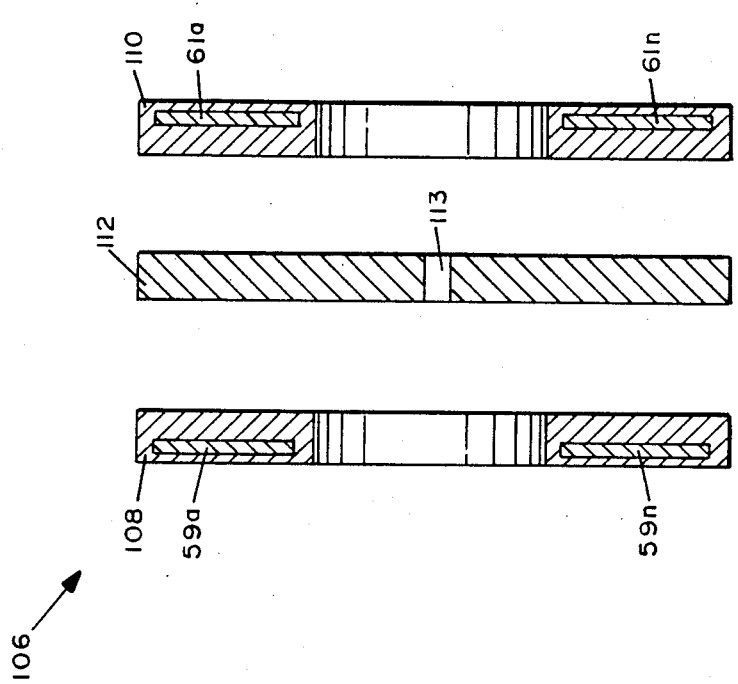
FIG. 7 illustrates an exploded end view of the magnetic gyro wheel.

FIG. 7 illustrates an exploded view in cross section of the gyro wheel members where all numerals correspond to those elements previously described. The illustrations are exaggerated along the x-axis for purposes of clarity. The ceramic magnets 59a-59n and 61a-61n are embedded near the outer edges of the magnetic discs 108 and 110. The flexible hub 112 includes a center hole 113 for mounting over the gyro wheel shaft 98 illustrated in FIG. 4.

Figure 8:
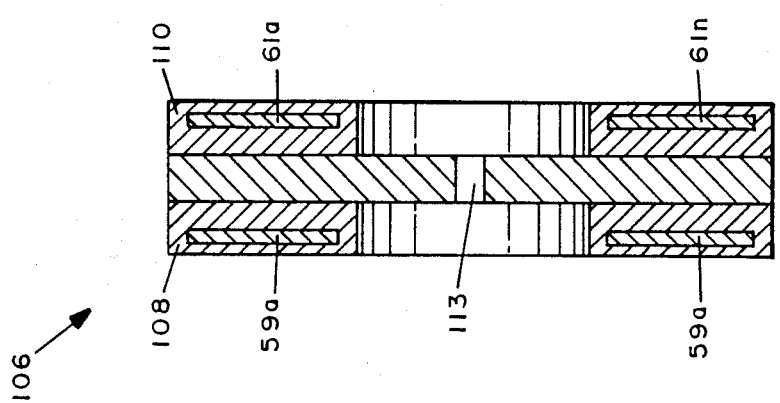
FIG. 8 illustrates an end view of the magnetic gyro wheel.

FIG. 8 illustrates the flexible hub magnetic gyro wheel 106 where all components are secured to each other with adhesive or like material and where all numerals correspond to those elements previously described.

Figure 9:
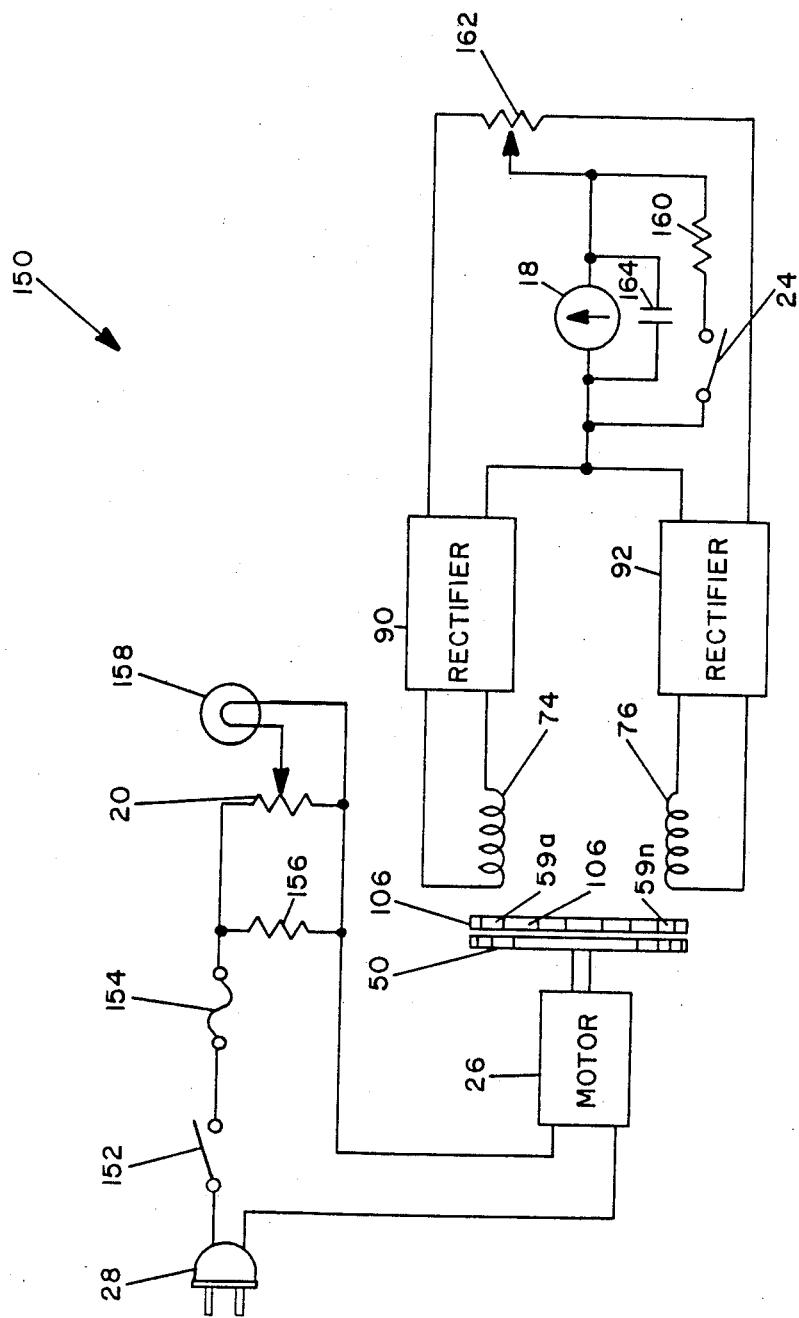
FIG. 9 illustrates an electrical schematic diagram for the rate of turn indicator.

FIG. 9, which illustrates an electrical circuit schematic diagram 150 of the electrical circuit for the rate of turn indicator 10, shows and AC power cord 28 and plug 76, a power switch 152, and a fuse 154 connected in series. A dropping resistor 156 provides power for the panel lamp 158, the brilliance of which is adjusted by the potentiometer 20. The motor 26 is driven by the AC power through the dropping resistor 156 and subsequently drives the drive wheel 50 and the flexible hub magnetic gyro wheel 106 including the plurality of permanent magnets 59a-59n about the flexible hub 112. Coils 74 and 76 generate induced currents for bridge rectifiers 90 and 92. The voltage induced in the coils 74 and 76 is proportional to the rate of turn of the vessel or vehicle such as a towboat utilizing the rate of turn indicator 10. The bridge rectifiers 90 and 92 rectify the coil voltage to a DC voltage to operate the rate of turn meter 18. The high/low sensitivity switch 2 in series with the meter shunt resistor 160 provides high and low sensitivity across the meter. The potentiometer 162 provides zero center of the rate of turn meter 18. A condenser 164 is wired across the rate of turn meter 18.

Various modifications can be made to the present invention without departing from the apparent scope hereof.

I claim:

1. Rate of turn indicator for displaying a turn from a predetermined course comprising:
   a. a housing;
   b. a motor secured to said housing;
   c. a power means for powering said motor;
   d. a gyroscopic rotor mounted in said housing and about a plurality of spaced coils with respect to said gyroscopic rotor;
   e. a drive wheel means for indirectly and magnetically coupling said motor to said gyroscopic rotor; and,
   f. a signal processing means including a plurality of said coils for generating an induced current signal responsively coupled to said gyroscopic rotor for generating a rate of turn signal; and,
   g. a signal display means connected to said signal processing means for displaying a rate of turn signal to an operator.

* * * * *